(12) United States Patent
Davies et al.

(10) Patent No.: US 8,265,028 B2
(45) Date of Patent: Sep. 11, 2012

(54) DISTRIBUTED ALLOCATION OF PHYSICAL CELL IDENTIFIERS

(75) Inventors: Richard L. Davies, Corsham (GB); Frederic Deville, Viroflay (FR); Gopal N. Kumar, Bridgewater, NJ (US); Jean-Michel Pugeat, Paris (FR)

(73) Assignee: Alcatel Lucent, Paris (FR)

( * ) Notice: Subject to any disclaimer, the term of this patent is extended or adjusted under 35 U.S.C. 154(b) by 283 days.

(21) Appl. No.: 12/714,896

(22) Filed: Mar. 1, 2010

(65) Prior Publication Data
US 2011/0038326 A1 Feb. 17, 2011

Related U.S. Application Data

(60) Provisional application No. 61/274,154, filed on Aug. 13, 2009.

(51) Int. Cl.
*H04W 4/00* (2009.01)
*H04W 40/00* (2009.01)
(52) U.S. Cl. ............ 370/329; 455/422.1; 455/446
(58) Field of Classification Search .......... 370/328, 370/329; 455/422.1, 446
See application file for complete search history.

(56) References Cited

FOREIGN PATENT DOCUMENTS
GB 2 083 595 A1 7/2009

OTHER PUBLICATIONS

International Search Report and Written Opinion mailed Nov. 4, 2010.
Nokia Siemens Networks: "Automatic Physical Cell ID Assingment" 3GPP Draft; S5-081171, $3^{rd}$ Generation Partnership Project (3GPP) Mobile Competence Centre; 650, Route DES Lucioles; F-06921 Sophia-Antipolis Cedex, France XP050307766; Jul. 1, 2008.
Nokia Siemens Networks: "R3-80376 Son Zse Case: Cell Ph_ID Automated Configuration" $3^{rd}$ Generation Partnership Project (3GPP) Technical Specification Group (TSG) Radio Access Network; XP002559389; Dec. 8, 2009.

*Primary Examiner* — Ronald Abelson
(74) *Attorney, Agent, or Firm* — Williams, Morgan & Amerson (57) ABSTRACT

The present invention provides a method of assigning cell identifiers to a plurality of cells. The method includes detecting cells within a selected distance from a first cell in the plurality of cells. The distance is selected to encompass portions of neighbor cells of the first cell and neighbor-of-neighbor cells of the first cell. The method also includes assigning a first cell identifier to the first cell. The first cell identifier is different than cell identifiers assigned to the cells detected within the selected distance from the first cell.

20 Claims, 5 Drawing Sheets

DISTRIBUTED ALLOCATION OF PHYSICAL CELL IDENTIFIERS

This application claims the benefit of the filing date of U.S. Provisional Application Ser. No. 61/274,154, filed Aug. 13, 2009, entitled "DISTRIBUTED ALLOCATION OF PHYSICAL CELL IDENTIFIERS".

BACKGROUND OF THE INVENTION

1. Field of the Invention

This invention relates generally to communication systems, and, more particularly, to wireless communication systems.

2. Description of the Related Art

Wireless communication systems typically include a plurality of base stations or access points that provide wireless connectivity to mobile units within a geographical area. The device that provides the wireless connectivity and the geographic area are both conventionally referred to as a cell. The air interface between the base station or access point and the mobile unit supports one or more downlink (or forward link) channels from the base station to the mobile unit and one or more uplink (or reverse link) channels from the mobile units to the base station. The uplink and/or downlink channels include traffic channels, signaling channels, broadcast channels, paging channels, pilot channels, and the like. The channels can be defined according to various protocols including time division multiple access (TDMA), frequency division multiple access (FDMA), code division multiple access (CDMA), orthogonal frequency division multiple access (OFDMA), as well as combinations of these techniques. The geographical extent of each cell may be time variable and may be determined by the transmission powers used by the base stations, access point, and/or mobile units, as well as by environmental conditions, physical obstructions, and the like.

Conventional hierarchical wireless communications include a central element such as a Radio Network Controller (RNC) or a Base Station Controller (BSC). The central controller coordinates operation of the base stations. For example, when data is available for a target mobile unit, the RNC may transmit paging messages to the target mobile unit via one or more base stations or node-Bs. The target mobile unit may establish a wireless link to one or more of the base stations in response to receiving the page from the wireless communication system. A radio resource management function within the RNC receives the voice and/or data and coordinates the radio and time resources used by the set of base stations to transmit the information to the target mobile unit. The radio resource management function can perform fine grain control to allocate and release resources for broadcast transmission over a set of base stations.

One alternative to the conventional hierarchical network architecture is a distributed architecture including a network of access points, such as base station routers or eNodeBs (eNBs), which implement distributed communication network functionality. For example, each base station router or eNB may combine RNC and/or packet data serving node (PDSN) functions in a single entity that manages radio links between one or more mobile units and an outside network, such as the Internet. Base station routers and eNBs wholly encapsulate the cellular access technology and can serve as a proxy for functionality that utilizes core network element support to provide equivalent IP functions. For example, IP anchoring in a UMTS base station router may be offered through a Mobile IP Home Agent (HA) and the GGSN anchoring functions that the base station router proxies by equivalent Mobile IP signaling. Compared to hierarchical networks that use centralized control, distributed architectures have the potential to reduce the cost and/or complexity of deploying the network, as well as the cost and/or complexity of adding additional wireless access points, e.g. base station routers and/or eNBs, to expand the coverage of an existing network. Distributed networks may also reduce (relative to hierarchical networks) the delays experienced by users because packet queuing delays at the separate RNC and PDSN entities in hierarchical networks may be reduced or removed.

Base stations, base station routers, eNBs and other access points are typically assigned cell identifiers that can be transmitted to the user equipment operating in the areas served by these devices. User equipment can use the identifiers for operations including hand off between different cells. For example, in Long Term Evolution (LTE) wireless communication systems, a physical cell identifier (PCI) is allocated to each cell in the distributed communication system. The cell identifiers can also be used to populate neighbor lists. For example, in LTE, lists of neighboring cells are populated automatically using automatic neighbor relationship (ANR). The PCI values have to be assigned to the cells before the automatic neighbor relationships can be established.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for assigning cell identifiers to a plurality of cells. The method includes detecting cells within a selected distance from a first cell in the plurality of cells. The distance is selected to encompass portions of neighbor cells of the first cell and neighbor-of-neighbor cells of the first cell. The method also includes assigning a first cell identifier to the first cell. The first cell identifier is different than cell identifiers assigned to the cells detected within the selected distance from the first cell.

In another embodiment, a method is provided for assigning cell identifiers to a plurality of cells. The method includes selecting a cell from the plurality of cells and detecting cells within a selected distance from the selected cell. The distance is selected to encompass portions of neighbor cells of the selected cell and neighbor-of-neighbor cells of the selected cell. The method also includes assigning a cell identifier to the selected cell. The cell identifier is different than cell identifiers assigned to the cells detected within the selected distance from the selected cell. The method further includes iteratively selecting other cells from the plurality of cells, detecting cells within the selected distance from the other selected cells, and assigning cell identifiers to each other selected cell so that the assigned cell identifiers are different than cell identifiers assigned to the cells within the selected distance from each other selected cell.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1A:
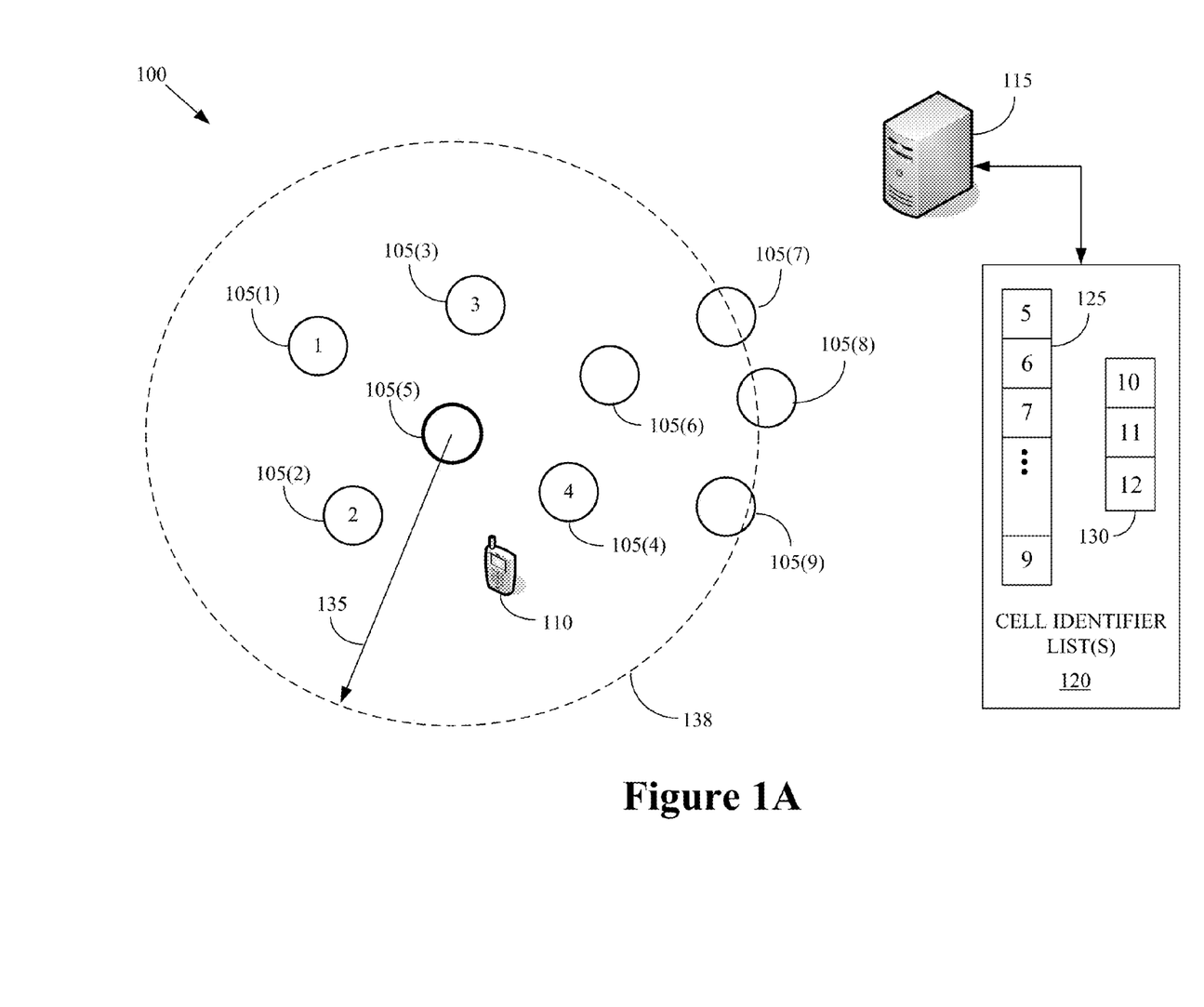
FIGS. 1A, 1B, and 1C conceptually illustrate a first exemplary embodiment of a wireless communication system.

FIG. 1A conceptually illustrates a first exemplary embodiment of a wireless communication system 100. In the illustrated embodiment, the wireless communication system 100 is a distributed communication system that uses a network of distributed access points 105. The distributed access points or cells 105 may be base station routers or eNobeBs that provide wireless connectivity to mobile units 110 within associated geographic areas that may also be called cells. The terms "cell," "distributed access point," "base station router," and "eNodeB" may therefore be used interchangeably in the present application except in cases when the context indicates that a particular term should be used. The base station routers 105 and/or eNodeBs 105 may combine RNC/BSC and/or packet data serving node (PDSN) functions in a single entity that manages radio links and/or resources for communication between one or more mobile units 110 and an outside network, such as the Internet. Base station routers 105 and eNBs 105 wholly encapsulate the cellular access technology and may proxy functionality that utilizes core network element support to equivalent IP functions. The base station routers 105 are therefore interconnected over interfaces such as the X2 interface defined by the Long Term Evolution (LTE) of 3GPP standards and/or protocols. These interfaces are used to support inter-cellular communication and signaling, such as the signaling used to support mobility of the mobile units 110.

The wireless communication system 100 also includes a server 115 that is used to perform distributed allocation of physical cell identifiers to the cells 105. However, persons of ordinary skill in the art having benefit of the present disclosure should appreciate that other entities in the wireless communication system 100 may alternatively be used to allocate the physical cell identifiers according to the techniques described herein. The server 115 is configured to allocate cell identifiers to the cells 105 so that the allocation scheme is collision-free and confusion-free. As used herein, the term "collision-free" will be understood to mean that cell 105 is not allocated the same identifier as any immediate neighbor of the cell 105. As used herein, the term "confusion-free" will be understood to mean that cell 105 is not allocated the same identifier as any neighbor of an immediate neighbor of the cell 105.

The server 115 maintains one or more cell identifier lists 120 that include lists of the identifiers that are available for allocation to the cells. For example, the cell identifier lists 120 may include one or more lists 125 of identifiers that are currently available for immediate allocation to the cells 105. The cell identifier lists 120 may also include one or more lists 130 of identifiers that are reserved for allocation under particular conditions. Exemplary conditions for allocating identifiers from the reserved lists 130 include situations where allocation of a physical cell identifier from the list 125 would lead to a collision with a physical cell identifier that was previously allocated to a neighbor cell 105 and/or situations where allocation of a physical cell identifier from the list 125 would lead to confusion with a physical cell identifier that was previously allocated to a neighbor-of-neighbor cell 105. The total number of available cell identifiers in the wireless communication system 100 is 504 for the illustrated embodiment. However, persons of ordinary skill in the art having benefit of the present disclosure should appreciate that the wireless communication system 100 may alternatively implement any number of cell identifiers.

In the illustrated embodiment, the server 115 is in the process of allocating physical cell identifiers to the cells 105. At the stay shown in FIG. 1A, the server 115 is in the process of allocating a physical cell identifier to the cell 105(5) so that the allocated physical cell identifier does not collide with any neighbor identifiers or result in confusion with any of the neighbor-of-neighbor identifiers. The server 115 therefore identifies cells 105 that are neighbors of the cell 105(5) and/or neighbors of the neighbors of the cell 105(5) by identifying all the cells within a selected distance 135 of the cell 105(5). The selected distance 135 can be determined using the maximum allowed path loss (MAPL) that may be set by the link budget of the cell 105(5). In one embodiment, the selected distance 135 is set to twice the MAPL. Alternatively, the selected distance 135 may be set to distances that are greater than twice the MAPL such as a distance of four times the MAPL. The selected distance 135 defines a circle 138 that may be referred to as a netting circle 138, which encompasses and/or overlaps neighbor cells and neighbor-of-neighbor cells.

Locations of the cells 105 may be stored in the server 115 or accessed by the server 115 as needed. For example, the server 115 may access GPS information indicating the latitudes and longitudes of the cells 105. The server 115 then uses these locations and the selected distance 135 to identify the neighbors of the cell 105(5) and the neighbors-of-neighbors of the cell 105(5). In the illustrated embodiment, the selected distance 135 encompasses or overlaps neighbors of the cell 105(5) and neighbors of the neighbors of the cell 105(5), which include the cells 105(1-4, 6-9) in FIG. 1A. The physical cell identifiers 1-4 have been allocated to the cells 105(1-4) and so these physical cell identifiers are not available for assignment to the cell 105(5) because assigning one of these physical cell identifiers would result in a collision and/or confusion with other physical cell identifiers. The server 115 allocates a physical cell identifier from the list 125 of available physical cell identifiers. For example, the server 150 may assign the physical cell identifier 5 to the cell 105(5). Persons of ordinary skill in the art having benefit of the present disclosure will appreciate that the correspondence between the physical cell identifiers 1-5 and the identifying indices of the cells 105(1-5) is coincidental and not intended to indicate any necessary or required correspondence between the physical cell identifiers and the identifying indices. In alternative embodiments, the physical cell identifiers may not be numerals and instead may be letters, binary numbers, colors, and the like.

Figure 1B:
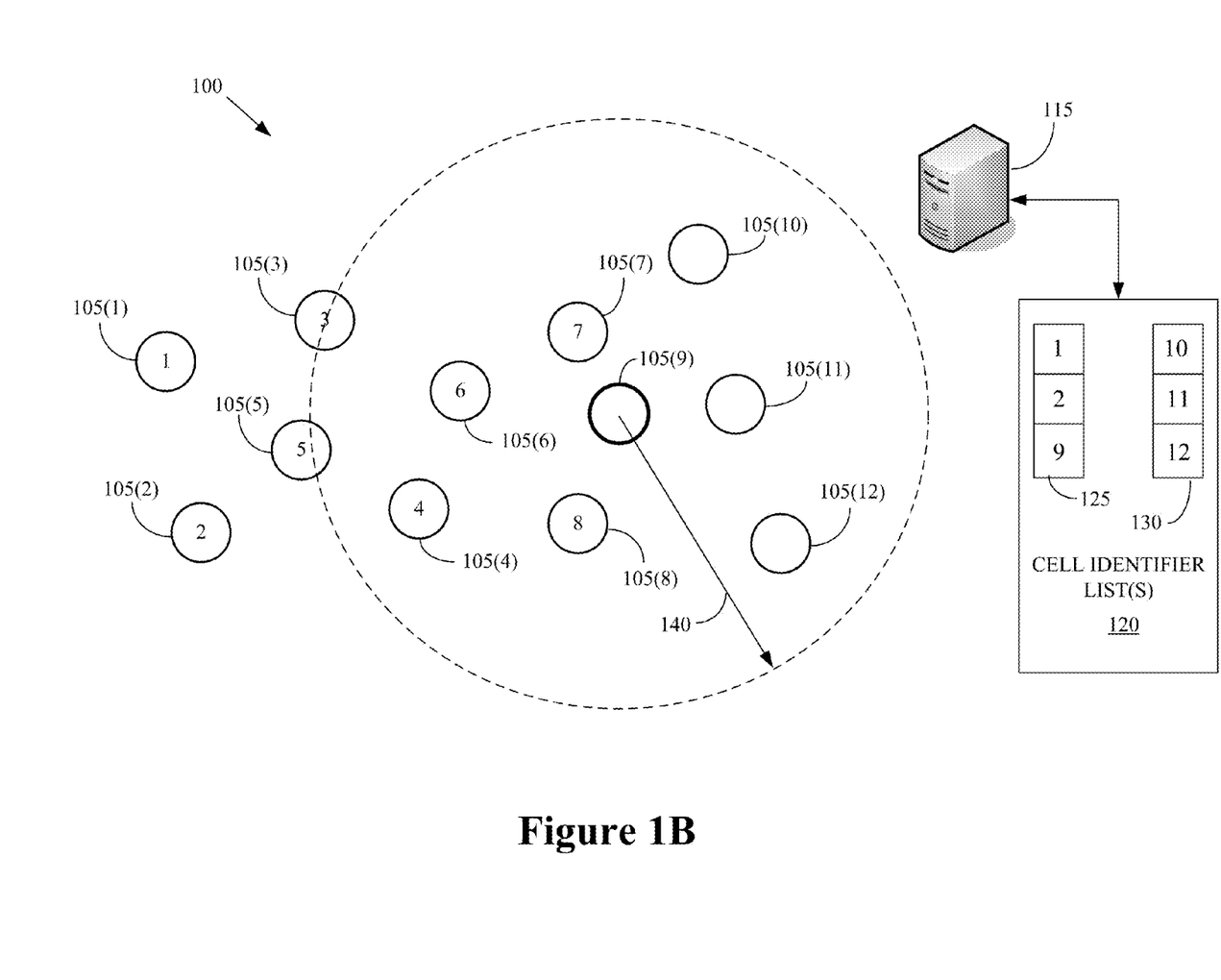

FIG. 1B conceptually illustrates the first exemplary embodiment of the wireless communication system 100 at a later stage in the physical cell identifier allocation process. At this stage in the process, physical cell identifiers 1-8 have been allocated to the cells 105(1-8) and physical cell identifiers have not yet been allocated to the cells 105(10-12). The server 115 is in the process of allocating a physical cell identifier to the cell 105(9) and so the server 115 selects a distance 140 based on the MAPL for the cell 105(9). Since the value of the MAPL depends on the link budget of the cell 105(9), the MAPL for the cell 105(9) may be different than the MAPL for other cells 105. For example, the selected distance 140 may be different than the selected distance 135 shown in FIG. 1A. The server 115 then gathers the identities of the cells 105(3-12) that are within the selected distance 140 of the cell 105(9). The cells 105(3-12) are therefore neighbors or neighbors-of-neighbors of the cell 105(9). As discussed herein, the cells 105(3-12) can be identified using latitude/longitude or other location information and the selected distance 140.

Physical cell identifiers 3-8 have previously been assigned to the neighbor and neighbor-of-neighbor cells 105(3-8). In the illustrated embodiment, the available physical cell identifiers are selected from the set 1-9, although persons of ordinary skill in the art should appreciate that this particular set of physical cell identifiers is intended to be illustrative and alternative embodiments can include any other number of physical cell identifiers. The list 125 of available cell identifiers therefore includes the identifiers 1-2 and 9 because assigning these identifiers to the cell 105(9) should not result in collisions with physical cell identifiers assigned to neighbors and/or confusion with physical cell identifiers assigned to neighbors-of-neighbors of the cell 105(9). The server 115 may select any of these physical cell identifiers and assign the selected identifier to the cell 105(9). For example, the server 115 may assign the identifier 9 to the cell 105(9).

Figure 1C:
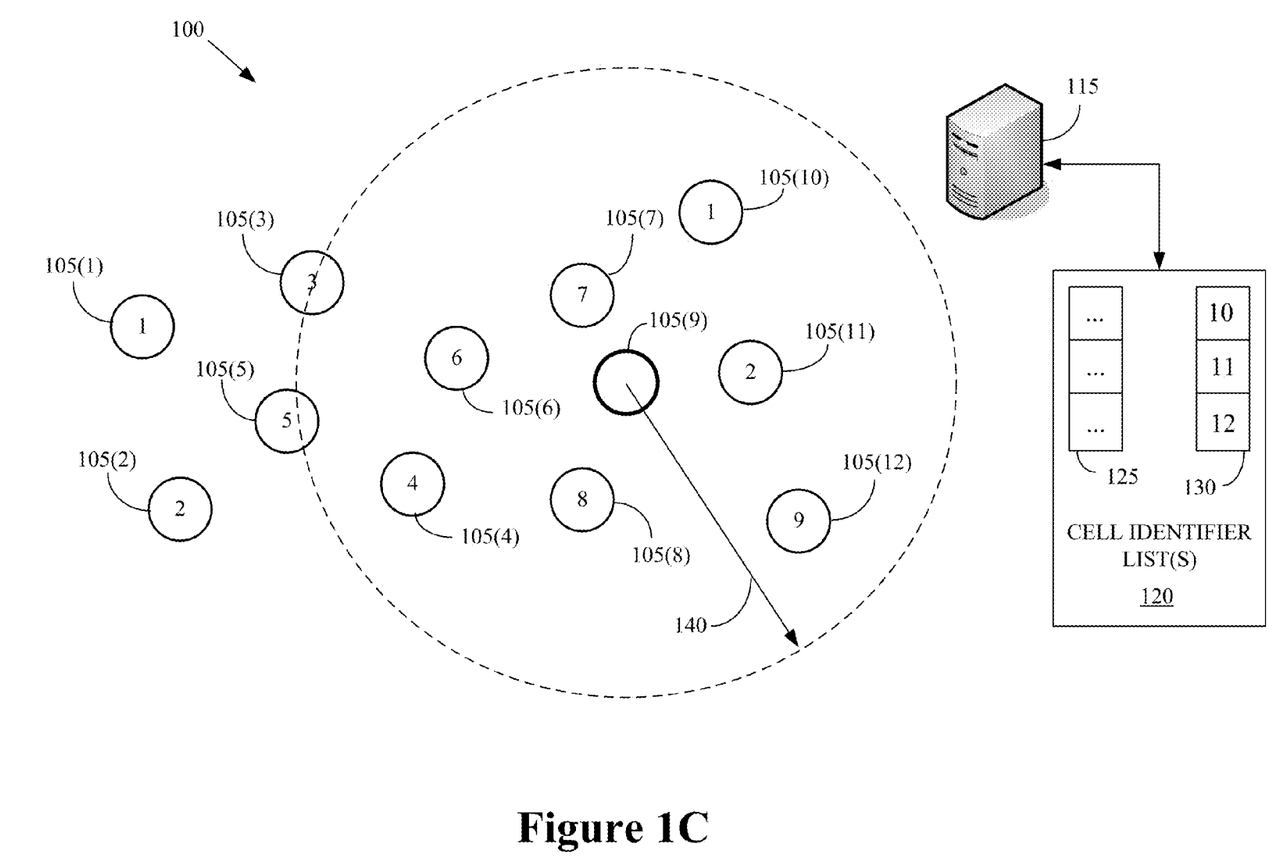

FIG. 1C conceptually illustrates the first exemplary embodiment of the wireless communication system 100 at a later stage in the physical cell identifier allocation process. The stage illustrated in FIG. 1C is alternate to the stage illustrated in FIG. 1B and differs from the stage illustrated in FIG. 1B because at this stage in the process, physical cell identifiers 1-9 have been allocated to the cells 105(3-8, 10-12). The cells 105(3-12) are within the selected distance 140 of the cell 105(9) and are considered neighbors or neighbors-of-neighbors of the cell 105(9). Assigning any of the physical cell identifiers 1-9 would therefore result in a collision with a neighboring cell identifier or confusion with a cell identifier of a neighbor-of-neighbor cell 105. The list 125 of available cell identifiers is therefore empty in the illustrated embodiment.

The server 115 can resolve the collision/confusion by selecting a physical cell identifier from the reserved cell identifier list 130. In one embodiment, the server 115 selects one of the physical cell identifiers 10-12 and assigns the selected physical cell identifier to the cell 105(9). For example, the server 115 can randomly select one of the physical cell identifiers 10-12. Alternatively, the server 115 can initially select one of the physical cell identifiers 1-9 during a first iteration of the physical cell identifier assignment algorithm. Then, on a subsequent iteration, the server 115 can identify the collision/confusion associated with the cell 105(9) and resolve the collision/confusion by modifying the initially selected physical cell identifier using a physical cell identifier that is randomly selected from the list 130. This iterative process can continue until collisions/confusions among the physical cell identifiers assigned to the cells 105 have been resolved.

Figure 2:
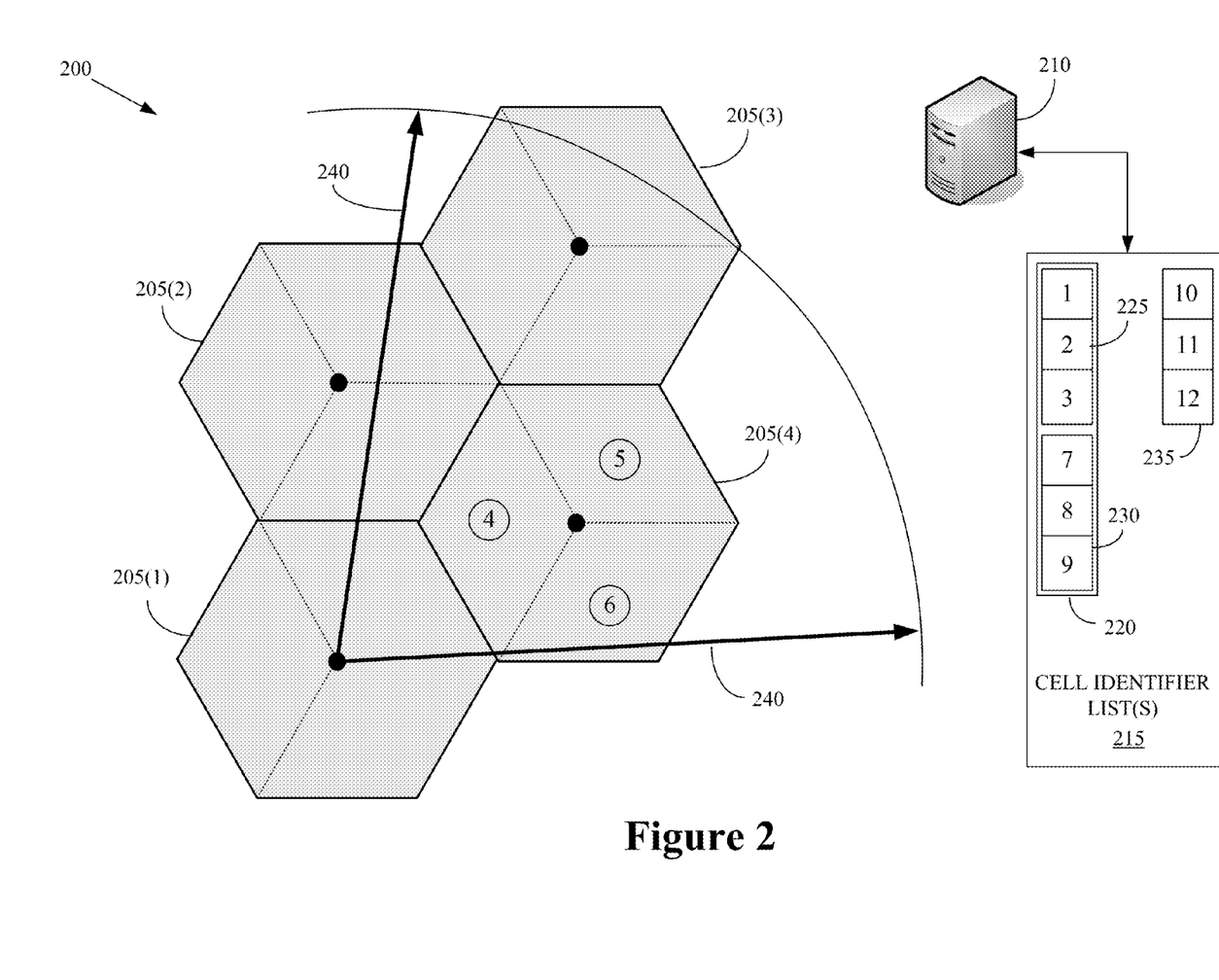
FIG. 2 conceptually illustrates a second exemplary embodiment of a wireless communication system.

FIG. 2 conceptually illustrates a second exemplary embodiment of a wireless communication system 200. In the second exemplary embodiment, each cell 205 is divided into three sectors. Sectorization of the cells 205 can be accomplished using a single access point that has multiple antennas to support the different sectors and/or by using a collection of different devices to serve the different sectors. Persons of ordinary skill in the art having benefit of the present disclosure should also appreciate that each cell 205 can be divided into different numbers of sectors. Physical cell identifiers are assigned to each sector within each cell 205 and should be assigned to prevent collisions and/or confusion among the physical cell identifiers assigned to the different sectors.

In the illustrated embodiment, a server 210 is used to allocate physical cell identifiers to the sectors within the cells 205. The physical cell identifiers are first grouped into groups that include a number of physical cell identifiers that corresponds to the number of sectors within the cells 205. In the illustrated embodiment, each cell 205 supports three sectors and so the physical cell identifiers are grouped into groups of three. The server 210 has previously allocated the group of physical cell identifiers 4-6 to the sectors of the cell 205(4). These physical cell identifiers have then been assigned to particular sectors within the cell 205(4), as indicated by the circled numerals within the sectors of the cell 205(4) shown in FIG. 2. A set 215 of cell identifier lists therefore indicates that the list 220 of available physical cell identifiers includes the group 225 of physical cell identifiers 1-3 and the group 230 of physical cell identifiers 7-9. The set 215 also includes a reserved group 235 of physical cell identifiers 10-12 that can be used to resolve collisions/confusions, as discussed herein.

The server 210 determines a selected distance 240 for the cell 205(1), e.g., by choosing the selected distance 240 to be a value that is at least twice the MAPL set by the link budget of the cell 205(1). The cells 205(2, 4) fall within the selected distance 240 and are determined to be neighbors of the cell 205(1). The cell 205(3) also falls within the selected distance 240 and is determined to be a neighbor-of-neighbor of the cell 205(1). In the interest of clarity, only four cells 205(1-4) have been depicted in FIG. 2. However, persons of ordinary skill in the art having benefit of the present disclosure should appreciate that the wireless communication system 200 may include other cells that are not depicted in FIG. 2. Persons of ordinary skill in the art should also appreciate that some or all of these cells can be neighbors or neighbors-of-neighbors of the cell 205(1). The physical cell identifiers in the group including the identifiers 4-6 have been assigned to sectors of the neighboring cell 205(4), as discussed herein. The server 210 can therefore select one of the groups 225, 230 to be assigned to the cell 205(1), which can then assign physical cell identifiers from the selected group to the sectors within the cell 205(1). For example, the server 210 can assign the group 225 to the cell 205(1), which may then assign the physical cell identifiers 1-3 to sectors within the cell 205(1).

One embodiment of a technique for allocating physical cell identifiers to sectors can be expressed as pseudocode. For example, the 3-sector case can be handled using the pseudocode fragment:

Let $X(i),Y(i)$ denote the co-ordinates of i-th eNB. There are K eNBs. Let R be the cell footprint radius. The netting circle has radius 2R.

$C(i)=0$, for $i=1, \ldots$, Number of eNBs ($C(i)$ holds the group level ID)

Do for i=1: Number of eNBFor each eNB, I (target eNB):

Initialize $G(j)$, $j=1, \ldots, 168$.

Collect all eNB index within netting circle of radius 2R in set $N(i,n)$; $n=1, \ldots$, Number of netted eNB within netting circle.

in=$N(i,n)$; If j=$C(in)$; if j>0 $G(j)=1$

Figure 3:
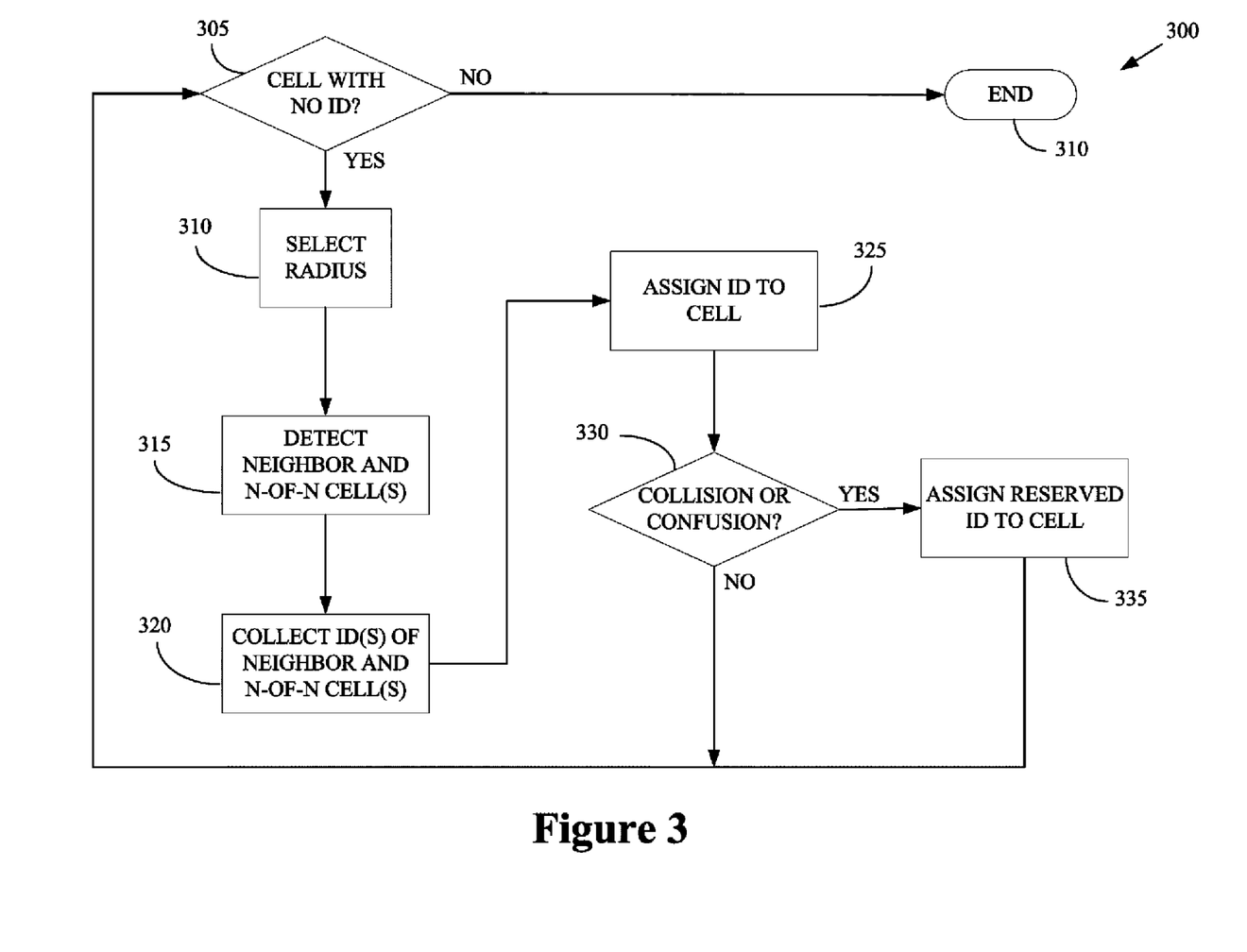
FIG. 3 conceptually illustrates one exemplary embodiment of a method of allocating physical cell identifiers.

Once $G(j)$ is updated over all netted eNBs for the target eNB, i:

Choose $C(i)=j^*$ such that $G(j^*)=0$ $j^*$ is the group ID and each group has 3 IDs—assign these to the 3 sectors FIG. 3 conceptually illustrates one exemplary embodiment of a method 300 for allocating physical cell identifiers. In the illustrated embodiment, the system checks (at 305) to see whether there are any cells that have not yet been allocated or assigned a physical cell identifier. The method 300 ends (at 310) when the cells have each been assigned a physical cell identifier. When the system detects (at 305) a cell that has not yet been allocated or assigned a physical cell identifier, a search or netting radius is selected (at 315) for the cell. The netting radius is selected (at 315) to be at least twice the MAPL for the cell. Neighbor cells and neighbor-of-neighbor (N-of-N) cells are then detected (at 320) for the cell that is being allocated or assigned a physical cell identifier. Neighbor cells and/or neighbor-of-neighbor cells can be detected (at 320) when they are within the netting circle and/or overlap with the netting circle. Physical cell identifiers that have been allocated or assigned to the neighbor and/or neighbor-of-neighbor cells are then collected (at 325).

A physical cell identifier can then be assigned (at 325) to the cell. The physical cell identifier should be selected so that it is different than the physical cell identifiers assigned to the cells within the netting circle. Selecting the physical cell identifiers according to this criterion can prevent collision and/or confusion between physical cell identifiers assigned to neighbors and neighbor-of-neighbor cells. The system may therefore also determine (at 330) whether selecting a particular physical cell identifier may lead to collision or confusion with other physical cell identifiers. The determination (at 330) may be made concurrently with assigning (at 325) a physical cell identifier or may alternatively be made after a physical cell identifier has been initially assigned (at 325) to the cell. In this case, the previously assigned physical cell identifier can be changed to resolve collisions and/or confusion. If no collision or confusion is detected (at 330), the system may continue to determine (at 305) whether or not additional physical cell identifiers are to be assigned. If a collision and/or confusion is detected (at 330), then a physical cell identifier from a reserved set can be assigned (at 335) to the cell. For example, a physical cell identifier can be randomly selected from the reserved set and assigned (at 335) to the cell. The system may then continue to determine (at 305) whether or not additional physical cell identifiers are to be assigned.

Embodiments of the techniques described herein provide a fast, robust, easy-to-implement procedure for allocating physical cell identifiers. The techniques described herein should provide a high level of collision-free and confusion-free allocation of physical cell identifiers to cells. Collisions and/or confusion that results from initial iterations of the techniques described herein can be resolved, e.g., by selecting reserved physical cell identifiers and/or using user equipment information and feedback indicating the physical cell identifiers of the cells that are or have been in communication with the user equipment. Embodiments of the present algorithm convert the conventional one-dimensional graph coloring problem into a two-dimensional geometric problem, which is a significant improvement at least in part because the neighborhood and neighbor-of-neighbor regions have a highly geometric significance based on distances related to the MAPL of each cell.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method of assigning cell identifiers to a plurality of cells, the method comprising:
    selecting, using a server, a distance from a first cell in the plurality of cells based on a maximum allowed path loss associated with the first cell;
    detecting, using the server, cells within the selected distance from the first cell, the distance being selected to encompass portions of neighbor cells of the first cell and neighbor-of-neighbor cells of the first cell; and
    assigning, using the server, a first cell identifier to the first cell, the first cell identifier being different than cell identifiers assigned to the cells detected within the selected distance from the first cell.

2. The method of claim 1, wherein selecting the distance from the first cell comprises selecting a distance of at least twice the maximum allowed path loss associated with the first cell.

3. A method of assigning cell identifiers to a plurality of cells, the method comprising:
    detecting, using a server, cells within a selected distance from a first cell in the plurality of cells, the distance being selected to encompass portions of neighbor cells of the first cell and neighbor-of-neighbor cells of the first cell, wherein detecting cells within the selected distance from the first cell comprises:
    determining, using the server, a plurality of physical locations of the plurality of cells;
    determining, using the server, a netting circle around the first cell using the selected distance; and
    selecting, using the server, at least one second cell when the physical location of said at least one second cell is within the netting circle; and
    assigning, using the server, a first cell identifier to the first cell, the first cell identifier being different than cell identifiers assigned to the cells detected within the selected distance from the first cell.

4. The method claim 1, wherein assigning the first cell identifier to the first cell comprises assigning a first cell identifier selected from a first subset of identifiers that have not been assigned to any of the cells detected within the selected distance from the first cell.

5. The method of claim 4, comprising determining that the first subset of identifiers have all been assigned to cells detected within the selected distance from the first cell, and wherein assigning the first cell identifier to the first cell comprises assigning a first cell identifier from a second subset of identifiers that are different from the first subset of identifiers and have been reserved for resolving collision and/or confusion between cell identifiers.

6. The method of claim 1, wherein a number of cell identifiers is less than the plurality of cells, and comprising assigning cell identifiers to each cell in the plurality of cells so that the cell identifier assigned to each cell does not collide with any cell identifier assigned to a cell within the selected distance from each cell and comprising assigning the cell identifiers to the plurality of cells so that the cell identifier assigned to each cell is not confused with any cell identifier assigned to a cell within the selected distance from each cell.

7. The method claim 3, wherein assigning the first cell identifier to the first cell comprises assigning a first cell identifier selected from a first subset of identifiers that have not been assigned to any of the cells detected within the selected distance from the first cell.

8. The method of claim 3, wherein a number of cell identifiers is less than the plurality of cells, and comprising assigning cell identifiers to each cell in the plurality of cells so that the cell identifier assigned to each cell does not collide with any cell identifier assigned to a cell within the selected distance from each cell and comprising assigning the cell identifiers to the plurality of cells so that the cell identifier assigned to each cell is not confused with any cell identifier assigned to a cell within the selected distance from each cell.

9. A method of assigning cell identifiers to a plurality of cells, the method comprising:
    detecting, using a server, cells within a selected distance from a first cell in the plurality of cells, the distance being selected to encompass portions of neighbor cells of the first cell and neighbor-of-neighbor cells of the first cell; and
    assigning, using the server, a first cell identifier to the first cell, the first cell identifier being different than cell identifiers assigned to the cells detected within the selected distance from the first cell, wherein each cell comprises a plurality of sectors and wherein assigning the first cell identifier to the first cell comprises assigning a plurality of first cell identifiers to the plurality of sectors in the first cell.

10. The method of claim 9, wherein assigning the plurality of first cell identifiers to the plurality of sectors in the first cell comprises:
    defining a plurality of groups of cell identifiers so that each group of cell identifiers includes a number of mutually exclusive cell identifiers that is the same as the number of sectors in each cell; and
    assigning a first group of cell identifiers to the first cell so that the first group of cell identifiers is different than any other group of cell identifiers assigned to cells within the selected distance; and
    assigning cell identifiers from the first group of cell identifiers to each sector of the first cell.

11. A method of assigning cell identifiers to a plurality of cells, the method comprising:
    selecting, using a server, a cell from the plurality of cells;
    selecting, using the server, a distance from the selected cell based on a maximum allowed path loss associated with the selected cell;
    detecting, using the server, cells within the selected distance from the selected cell, the distance being selected to encompass portions of neighbor cells of the selected cell and neighbor-of-neighbor cells of the selected cell;
    assigning, using the server, a cell identifier to the selected cell, the cell identifier being different than cell identifiers assigned to the cells detected within the selected distance from the selected cell; and
    iteratively selecting, using the server, other cells from the plurality of cells, detecting cells within selected distances from the other selected cells, wherein the other selected distances are selected based on maximum allowed path losses associated with the other selected cells, and assigning cell identifiers to each other selected cell so that the assigned cell identifiers are different than cell identifiers assigned to the cells within the selected distance from each other selected cell.

12. The method of claim 11, wherein selecting the distances from the cells comprises selecting a distance of at least twice the maximum allowed path loss associated with the selected cells.

13. The method of claim 11, wherein a number of cell identifiers is less than a number of cells, and comprising assigning cell identifiers to each cell in the plurality of cells so that the cell identifier assigned to each cell does not collide with any cell identifier assigned to a cell within the selected distance from each cell and comprising assigning the cell identifiers to the plurality of cells so that the cell identifier assigned to each cell is not confused with any cell identifier assigned to a cell within the selected distance from each cell.

14. A method of assigning cell identifiers to a plurality of cells, the method comprising:
    selecting, using a server, a cell from the plurality of cells;
    detecting, using the server, cells within a selected distance from the selected cell, the distance being selected to encompass portions of neighbor cells of the selected cell and neighbor-of-neighbor cells of the selected cell, wherein detecting cells within the selected distance from the selected cells comprises:
    determining, using the server, a plurality of physical locations of the plurality of cells;
    determining, using the server, a netting circle around the each cell using the selected distance; and
    selecting, using the server, at least one cell when the physical location of said at least one cell is within the netting circle;
    assigning, using the server, a cell identifier to the selected cell, the cell identifier being different than cell identifiers assigned to the cells detected within the selected distance from the selected cell; and
    iteratively selecting, using the server, other cells from the plurality of cells, detecting cells within the selected distance from the other selected cells, and assigning cell identifiers to each other selected cell so that the assigned cell identifiers are different than cell identifiers assigned to the cells within the selected distance from each other selected cell.

15. The method of claim 11, wherein assigning the cell identifiers to the cells comprises assigning cell identifiers selected from a first subset of identifiers.

16. The method of claim 15, comprising determining that the first subset of identifiers have all been assigned to cells detected within the selected distance from the selected cell, and wherein assigning the cell identifier to the selected cell comprises assigning a first cell identifier from a second subset of identifiers that are different from the first subset of identifiers and have been reserved for resolving collision and/or confusion between cell identifiers.

17. The method of claim 14, wherein assigning the cell identifiers to the cells comprises assigning cell identifiers selected from a first subset of identifiers.

18. The method of claim 14, wherein a number of cell identifiers is less than a number of cells, and comprising assigning cell identifiers to each cell in the plurality of cells so that the cell identifier assigned to each cell does not collide with any cell identifier assigned to a cell within the selected distance from each cell and comprising assigning the cell identifiers to the plurality of cells so that the cell identifier assigned to each cell is not confused with any cell identifier assigned to a cell within the selected distance from each cell.

19. A method of assigning cell identifiers to a plurality of cells, the method comprising:
    selecting, using a server, a cell from the plurality of cells;
    detecting, using the server, cells within a selected distance from the selected cell, the distance being selected to encompass portions of neighbor cells of the selected cell and neighbor-of-neighbor cells of the selected cell;
    assigning, using the server, a cell identifier to the selected cell, the cell identifier being different than cell identifiers assigned to the cells detected within the selected distance from the selected cell; and
    iteratively selecting, using the server, other cells from the plurality of cells, detecting cells within the selected distance from the other selected cells, and assigning cell identifiers to each other selected cell so that the assigned cell identifiers are different than cell identifiers assigned to the cells within the selected distance from each other selected cell, wherein each cell comprises a plurality of sectors and wherein assigning a cell identifier to the selected cell comprises assigning a plurality of cell identifiers to the plurality of sectors in the selected cell.

20. The method of claim 19, wherein assigning the plurality of cell identifiers to the plurality of sectors in the selected cell comprises:
    defining a plurality of groups of cell identifiers so that each group of cell identifiers includes a number of mutually exclusive cell identifiers that is the same as the number of sectors in each cell; and
    assigning a group of cell identifiers to the selected cell so that the group of cell identifiers is different than any other group of cell identifiers assigned to cells within the selected distance; and
    assigning cell identifiers from the group of cell identifiers to each sector of the selected cell.

* * * * *